United States Patent
Teufl et al.

(10) Patent No.: US 12,283,691 B2
(45) Date of Patent: Apr. 22, 2025

(54) CATHODE ACTIVE MATERIAL AND METHOD FOR MAKING SUCH CATHODE ACTIVE MATERIAL

(71) Applicant: BASF SE, Ludwigshafen am Rhein (DE)

(72) Inventors: Tobias Maximilian Teufl, Poing (DE); Benjamin Johannes Herbert Bergner, Ludwigshafen am (DE)

(73) Assignee: BASF SE, Ludwigshafen am Rhein (DE)

( * ) Notice: Subject to any disclaimer, the term of this patent is extended or adjusted under 35 U.S.C. 154(b) by 273 days.

(21) Appl. No.: 17/758,728

(22) PCT Filed: Jan. 28, 2021

(86) PCT No.: PCT/EP2021/051910
§ 371 (c)(1),
(2) Date: Jul. 13, 2022

(87) PCT Pub. No.: WO2021/156124
PCT Pub. Date: Aug. 12, 2021

(65) Prior Publication Data
US 2023/0053750 A1 Feb. 23, 2023

(30) Foreign Application Priority Data
Feb. 7, 2020 (EP) .................................. 20156052

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC ................. H01M 4/525; H01M 4/505; H01M 2004/021; H01M 2004/028; C01G 53/50;
(Continued)

(56) References Cited

U.S. PATENT DOCUMENTS

2019/0044139 A1* 2/2019 Sakai ..................... C01G 53/50
2019/0386311 A1* 12/2019 Bauer ................... H01M 4/665

FOREIGN PATENT DOCUMENTS

| CN | 108 172 822 A | 6/2018 |
| CN | 105 680 025 B | 10/2018 |

(Continued)

OTHER PUBLICATIONS

International Search Report dated Apr. 7, 2021, PCT/EP2021/051910.
(Continued)

*Primary Examiner* — Andrew J. Oyer
(74) *Attorney, Agent, or Firm* — Armstrong Teasdale LLP

(57) ABSTRACT

Cathode active material in particulate form with a mean particle diameter in the range from 2 to 16 μm (D50), wherein the cathode active material has the composition $L_{1+x}TM_{1-x}O_2$ wherein x is in the range of from 0.1 to 0.2 and TM is a combination of elements according to general formula (I), $(Ni_aCo_bMn_c)_{1-d-e}M^1{}_dM^2{}_e$ where the variables are each defined as follows: a is in the range from 0.20 to 0.40, b is in the range of from zero to 0.15, c is in the range of from 0.50 to 0.75, d is in the range of from zero to 0.015, and e is in the range of from zero to 0.02, $M^1$ is selected from Al, Ti, Zr, Mo, W, Fe, Nb, and Mg, $M^2$ is selected from B and K, with a+b+c=1.0 wherein said composite oxide has a specific surface (BET) in the range from 0.5 $m^2/g$ to 10 $m^2/g$ and a pressed density of at least 2.9 $g/cm^3$, and wherein said cathode active material has an average primary particle diameter in the range of from 200 to 3,000 nm.

5 Claims, 1 Drawing Sheet

SEM image of CAM.1 before ball-milling

Figure 1:
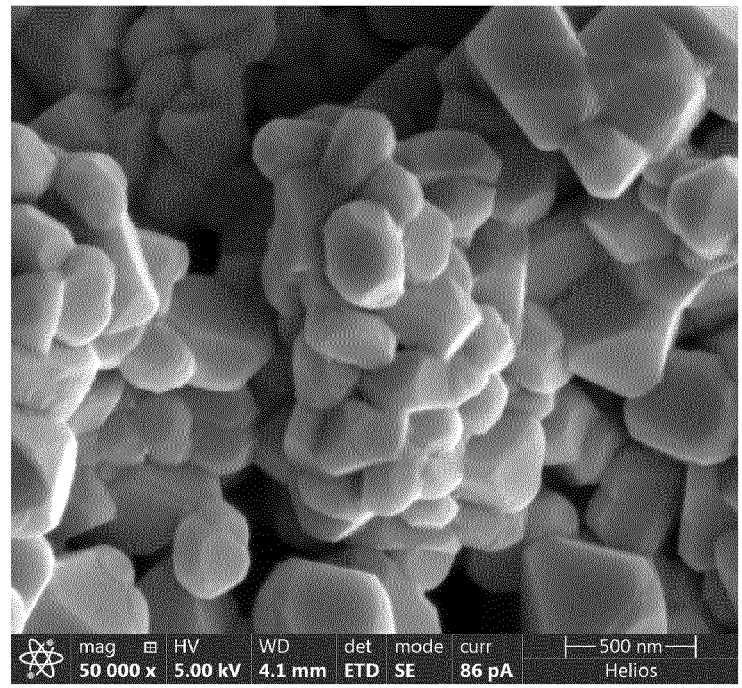

(51) Int. Cl.
  *C01G 53/50* (2025.01)
  *H01M 4/02* (2006.01)
  *H01M 4/505* (2010.01)
(52) U.S. Cl.
  CPC ...... *C01P 2002/50* (2013.01); *C01P 2002/74* (2013.01); *C01P 2004/03* (2013.01); *C01P 2004/61* (2013.01); *C01P 2004/62* (2013.01); *C01P 2006/10* (2013.01); *C01P 2006/12* (2013.01); *C01P 2006/40* (2013.01); *H01M 2004/021* (2013.01); *H01M 2004/028* (2013.01)
(58) Field of Classification Search
  CPC .............. C01P 2002/50; C01P 2002/74; C01P 2004/03; C01P 2004/61; C01P 2004/62; C01P 2006/10; C01P 2006/12; C01P 2006/40; C01P 2002/52; C01P 2004/50; C01P 2006/11; C01P 2002/70; Y02E 60/10

See application file for complete search history.

(56) References Cited

FOREIGN PATENT DOCUMENTS

| EP | 3486980 A1 | 5/2019 |
| WO | WO 2019/103460 A1 | 5/2019 |
| WO | WO 2019/132332 A1 | 7/2019 |
| WO | WO 2019/168301 A1 | 9/2019 |

OTHER PUBLICATIONS

European Search Report for EP Patent Application No. 20156052.1, Issued on Aug. 17, 2020, 3 pages.

\* cited by examiner

SEM image of CAM.1 before ball-milling

SEM image of C-CAM.2

CATHODE ACTIVE MATERIAL AND METHOD FOR MAKING SUCH CATHODE ACTIVE MATERIAL

This application is a national stage filing under 35 U.S.C. § 371 of International Application No. PCT/EP2021/051910, filed on Jan. 28, 2021, which claims priority to EP Application No. 20156052.1, filed on Feb. 7, 2020; the contents of each are incorporated herein by reference in their entirety.

The present invention is directed towards an cathode active material in particulate form with a mean particle diameter in the range from 2 to 16 μm (D50), wherein the cathode active material has the composition $Li_{1+x}TM_{1-x}O_2$ wherein x is in the range of from 0.1 to 0.2 and TM is a combination of elements according to general formula (I),

(I)

where the variables are each defined as follows:
a is in the range from 0.20 to 0.40,
b is in the range of from zero to 0.15,
c is in the range of from 0.50 to 0.75,
d is in the range of from zero to 0.015, and
e is in the range of from zero to 0.02,
$M^1$ is selected from Al, Ti, Zr, Mo, W, Fe, Nb, and Mg,
$M^2$ is selected from B and K,
with a+b+c=1.0
wherein said composite oxide has a specific surface (BET) in the range from 0.5 m²/g to 10 m²/g and a pressed density of at least 2.9 g/cm³,
and wherein said cathode active material has an average primary particle diameter in the range of from 200 to 3,000 nm.

Lithiated transition metal oxides are currently being used as cathode active materials for lithium-ion batteries. Extensive research and developmental work has been performed in the past years to improve properties like charge density, specific energy, but also other properties like the reduced cycle life and capacity loss that may adversely affect the lifetime or applicability of a lithium-ion battery. Additional effort has been made to improve manufacturing methods.

Many cathode active materials discussed today are of the type of lithiated nickel-cobalt-manganese oxide ("NCM materials") or lithiated nickel-cobalt-aluminum oxide ("NCA materials").

In a typical process for making cathode materials for lithium-ion batteries, first a so-called precursor is being formed by co-precipitating the transition metals as carbonates, oxides or preferably as hydroxides that may or may not be basic. The precursor is then mixed with a source of lithium such as, but not limited to LiOH, $Li_2O$ or $Li_2CO_3$ and calcined (fired) at high temperatures. Lithium salt(s) can be employed as hydrate(s) or in dehydrated form. The calcination—or firing—generally also referred to as thermal treatment or heat treatment of the precursor—is usually carried out at temperatures in the range of from 600 to 1,000° C. During the thermal treatment a solid state reaction takes place, and the cathode active material is formed. In cases hydroxides or carbonates are used as precursors the solid state reaction follows a removal of water or carbon dioxide. The thermal treatment is performed in the heating zone of an oven or kiln.

Extensive research has been performed on improvement of various properties of cathode active materials, such as energy density, charge-discharge performance such as capacity fading, and the like. However, many cathode active materials suffer from limited cycle life and voltage fade. This applies particularly to many Mn-rich cathode active materials.

In EP 3 486 980, specific high-manganese cathode active materials with a high energy density retention rate are disclosed. However, the cathode active materials disclosed suffer from a limited energy density as such.

It was therefore an objective of the present invention to provide cathode active materials with both a high energy density and a high energy density retention rate. It was further an objective to provide a process for making cathode active materials with both a high energy density and a high energy density retention rate. It was further an objective to provide applications of cathode active materials with both a high energy density and a high energy density retention rate.

BRIEF DESCROPTION OF THE DRAWINGS

Figure 2:
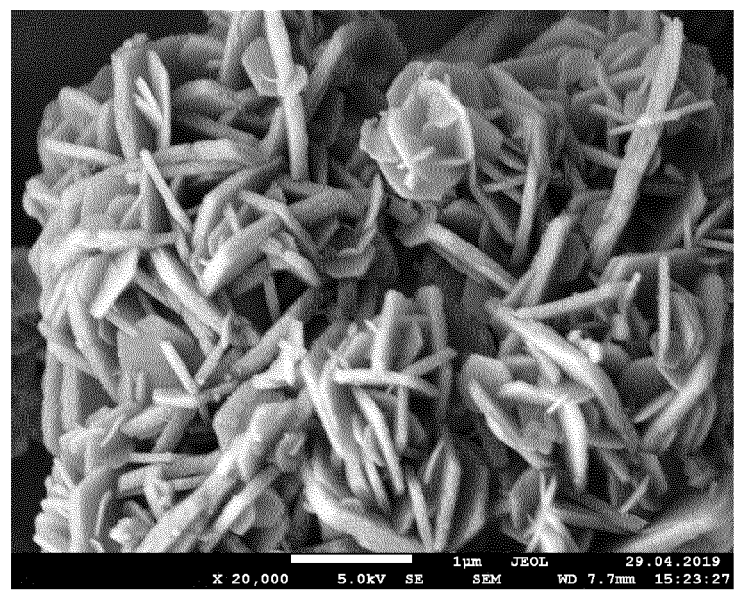

FIG. 1 shows a SEM inage of CAM.1 before ball-milling
FIG. 2 shows a SEM image of C-CAM.2.

Accordingly, the cathode active material as defined at the outset has been found, hereinafter also defined as inventive cathode active material or as cathode active material according to the current invention. The inventive cathode active material shall be described in more detail below.

Inventive cathode active material is in particulate form. The average particle diameter D50 is in the range of from 2 to 16 μm, preferably 2 to 6 μm. The average particle diameter is preferably determined by LASER diffraction. It refers to the secondary particle diameter.

In one embodiment of the present invention, the width of the particle diameter distribution of inventive cathode active materials is at least 0.61, for example 0.61 to 2, preferably 0.65 to 1.5, expressed as [(D90-D10)/(D50) diameter], preferably determined by LASER diffraction. Inventive cathode active materials may have a monomodal or bimodal particle diameter distribution Inventive cathode active material has the composition $Li_{1+x}TM_{1-x}O_2$ wherein x is in the range of from 0.1 to 0.2, preferably from 0.13 to 0.17, and TM is a combination of elements according to general formula (I),

(I)

where the variables are each defined as follows:
a is in the range from 0.20 to 0.40, preferably 0.27 to 0.36,
b is in the range of from zero to 0.15, preferably zero to 0.05,
c is in the range of from 0.50 to 0.75, preferably 0.60 to 0.72,
d is in the range of from zero to 0.015, preferably zero to 0.012,
e is in the range of from zero to 0.02, preferably 0.002 to 0.015, and
and a b+c=1.0,
$M^1$ is selected from Al, Ti, Zr, Mo, W, Fe, Nb, and Mg,
$M^2$ is selected from B and K.

In one embodiment of the present invention, the inventive material is comprised of spherical particles, that are particles have a spherical shape. Spherical particles shall include not just those which are exactly spherical but also those particles in which the maximum and minimum diameter of at least 90% (number average) of a representative sample differ by not more than 10%.

In one embodiment of the present invention, the inventive cathode active material is comprised of secondary particles that are agglomerates of primary particles. Preferably, inventive cathode active material is comprised of spherical secondary particles that are agglomerates of primary particles. Even more preferably, inventive cathode active material is comprised of spherical secondary particles that are agglomerates of spheroidal primary particles. In a preferred embodiment of the present invention, the secondary particles are composed of 2 to 35 primary particles on average, or the primary particles are not agglomerated at all.

Spheroidal is not restricted to exactly spherical particles. Spheroidal means in this context that the maximum and minimum diameter of a primary particles is distinguished by no more than 20%.

In one embodiment of the present invention, said primary particles of inventive material have an average diameter in the range from 200 to 3,000 nm, preferably from 600 to 2,500 nm. The average primary particle diameter can, for example, be determined by SEM, EBSD or TEM. SEM is an abbreviation of scanning electron microscopy, EBSD is an abbreviation for electron back scattering diffraction, TEM is an abbreviation of transmission electron microscopy.

In one embodiment of the present invention, the particles of inventive material are single crystals or agglomerates of single crystals. A single crystal is characterized by a uniform crystallographic orientation. Crystallographic orientations, typically investigated for cross-sections of cathode active materials, can be distinguished according to their EBSD pattern or their texture in an SEM or TEM image. EBSD patterns are often visualized by showing areas of a uniform crystallographic orientation in the same color. For example, the size of a single crystal can be therefore defined by the dimensions of an area of uniform color.

Some metals are ubiquitous such as sodium, calcium or zinc, and traces of them virtually present everywhere, but such traces will not be taken into account in the context of the present invention. Traces in this context will mean amounts of 0.01 mol-% or less, referring to the total metal content of inventive cathode active material.

$M^1$ may be dispersed homogeneously or unevenly in particles of inventive material. Preferably, $M^1$ is distributed unevenly in particles of inventive material, even more preferably as a gradient, with the concentration of $M^1$ in the outer shell being higher than in the center of the particles.

Inventive cathode active materials have a specific surface (BET), hereinafter also referred to as BET surface, in the range from 0.5 $m^2$/g to 10 $m^2$/g and a pressed density of at least 2.9 g/$cm^3$, preferably from 3 to 3.6 g/$cm^3$, more preferably from 3.1 to 3.20 g/$cm^3$. The pressed density is determined at a pressure of 250 MPa. The BET surface may be determined by nitrogen adsorption after outgassing of the sample at 200° C. for 30 minutes or more and beyond this accordance with DIN ISO 9277:2010.

In a preferred embodiment, inventive cathode active materials have a structural strain of 0.8% or less, preferably 0.15 to 0.6% for the reflection peak between 29.8-30.6° of the corresponding X-Ray diffraction pattern using Mo-Kα X-radiation. The structural strain may be determined by Rietveld refinement from the corresponding diffraction pattern.

Inventive cathode active materials have excellent energy retention and a high energy density, and they are excellently suited for making cathodes for lithium ion batteries.

A further aspect of the present invention relates to a process for making a cathode active material for lithium ion batteries wherein said process comprises the steps of (a1) mixing a manganese composite (oxy)hydroxide whose metal part has the general formula (II a)

with a source of lithium and a flux agent based on $M^2$, or
(a2) mixing a manganese composite (oxy)hydroxide whose metal part has the general formula (II b)

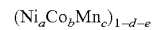

with a source of lithium and at least one compound of $M^1$ and a flux agent based on $M^2$, and of (b) calcining the mixture at a temperature in the range of from 800 to 1050° C. wherein a is in the range from 0.20 to 0.40, preferably 0.27 to 0.36,
b is in the range of from zero to 0.15, preferably zero to 0.05,
c is in the range of from 0.50 to 0.75, preferably 0.60 to 0.72,
d is in the range of from zero to 0.015, preferably zero to 0.012, and
e is in the range of from zero to 0.02, preferably 0.002 to 0.015
wherein $M^1$ is selected from Al, Ti, Zr, Mo, W, Fe, Nb, and Mg, and
$M^2$ is selected from B and
with a+b+c=1.0.

The resultant cathode active material has the formula $Li_{1+x}TM_{1-x}O_2$, wherein TM is as defined above, and x is in the range of from 0.1 to 0.2, preferably from 0.13 to 0.17.

The steps of the inventive process may also be referred to as step (a1), step (a2), step (b), step (c) etc.

Suitable sources of lithium in step (a1) and (a2) are LiOH, $Li_2O$ or $Li_2CO_3$. Preferred is lithium hydroxide which may be used as hydrate, for example monohydrate, or in dehydrated form.

As a flux agent, a compound of $M^2$ is added. Preferably, 0.1 to 2% by weight of flux agent is added in step (a1) or (a2), the percentage referring to the manganese composite (oxy)hydroxide.

Examples of suitable flux agents are selected from boron compounds, preferably boron oxide, $B_2O_3$, lithium borates such as $LiBO_2$, $LiB_3O_5$, $Li_2B_4O_7$ and especially boric acid $B(OH)_3$, and potassium compounds, especially KCl, $K_2CO_3$ and $KHCO_3$. Particularly preferred is boric acid.

Examples of compounds of $M^1$ are especially oxides, (oxy)hydroxides, carbonates and hydroxides of $M^1$. Specific examples of oxides, (oxy)hydroxides, carbonates and hydroxides Al, Ti, Zr, Mo, W, Fe, Nb, and Mg are $Al_2O_3$, $Al(OH)_3$, AlOOH, $Al_2O_3 \cdot aq$, $TiO_2$, $TiO_2 \cdot aq$, $TiO(OH)_2$, $ZrO_2$, $ZrO_2 \cdot aq$, $ZrO(OH)_2$, $Fe_2O_3$, FeOOH, $Fe_2O_3 \cdot aq$, $MoO_3$, $WO_3$, $Li_2WO_4$, $Nb_2O_3$, $Nb_2O_5$, $Mg(OH)_2$ and MgO and combinations of at least two of the foregoing. Preferred are oxides and oxyhydroxides of Al, Zr and W.

In one embodiment of the present invention, the molar ratio of Li to the sum of Ni, Co, Mn and $M^1$ and—if present—$M^2$—is in the range of from 1.1:0.9 to 1.5:1.

In another embodiment of the present invention, the molar ratio of Li to the sum of Ni, Co, Mn and $M^1$ is in the range of from 1.1:0.9 to 1.5:1.

Mixing according to step (a1) or (a2) may be performed in a mixer, e.g., a in a plough-share mixer, or a tumble mixer. For laboratory scale experiments, roller mills and ball mills may be applied as well.

Composite (oxy)hydroxides of $(Ni_aCo_bMn_c)_{1-d-e}M^1_d$ and of $(Ni_aCo_bMn_c)_{1-d-e}$ may be obtained by coprecipitation of Mn and Ni and, optionally, of Co and/or $M^1$ with alkali metal hydroxide, for example potassium hydroxide or sodium hydroxide from an aqueous solution, in the presence or absence of ammonia or of an organic acid such as citric acid or glycine.

Such composite (oxy)hydroxides of $(Ni_aCo_bMn_c)_{1-d-e}M^1_d$ and of $(Ni_aCo_bMn_c)_{1-d-e}$ may have the same particle diameter distribution of the secondary particles as the inventive cathode active materials.

To perform step (b) of the inventive process, the mixture obtained according to step (a1) or (a2) is calcined at a temperature in the range of from 650 to 1000° C., preferably 875 to 950° C.

Step (b) of the inventive process can be performed in a furnace, for example in a rotary tube furnace, in a muffle furnace, in a pendulum furnace, in a roller hearth furnace or in a push-through furnace. Combinations of two or more of the aforementioned furnaces are possible as well.

Step (b of the inventive process can be performed over a period of 30 minutes to 24 hours, preferably 3 to 12 hours. Step (b) can be effected at a temperature level, or a temperature profile can be run.

In one embodiment of the present invention, step (b) is being performed in an oxygen-containing atmosphere. Oxygen-containing atmosphere includes an atmosphere of air, of pure oxygen, of mixtures from oxygen with air, and of air diluted with an inert gas such as nitrogen. In step (b), preferred is an atmosphere of oxygen or oxygen diluted with air or nitrogen and a minimum content of oxygen of 21 vol.-%.

In one embodiment of the present invention, before step (a) at least one pre-calcining step (a*) is being performed. Step (a*) comprises heating the composite (oxy)hydroxides of $(Ni_aCo_bMn_c)_{1-d-e}M^1_d$ and of $(Ni_aCo_bMn_c)_{1-d-e}$ at a temperature in the range of from 300 to 700° C. for a period of 2 to 24 hours.

During the temperature changes, a heating rate of 1 K/min up to 10 K/min can be obtained, preferred is 2 to 5 K/min.

After step (b), it is preferred to cool down the material obtained to ambient temperature.

By performing steps (a1) or (a2), followed by step (b), a cathode active material with excellent properties is obtained. It is a particulate material.

It is preferred to perform at least one additional step (c), (d), or (e). It is even more preferred to perform steps (c) and (d) or (e).

In step (c), said particulate material obtained from step (b) is treated with a mineral acid or an aqueous solution of a compound of $M^1$ or a combination thereof, preferably a solution of an inorganic aluminum compound. Said aqueous solution may have a pH value in the range of from 1 up to 8, preferably at least 2, more preferably from 2 to 7. It is observed that at the end of step (c), the pH value of the aqueous phase is preferably in the range of from 3 to 6.

Examples of mineral acids are nitric acid and in particular sulphuric acid, for example in a concentration of 0.01 M to 2 M, preferably 0.1 to 1.5 M.

It is preferred that the water hardness of said aqueous solution used in step (c) is at least partially removed, especially the calcium. The use of desalinized water is preferred.

Such compound of $M^1$ should be readily soluble in water. "Readily soluble" in this context means a solubility of at least 10 g compound of $M^1$/l water at 25° C.

Examples of suitable aluminum compounds are $Al_2(SO_4)_3$, $KAl(SO_4)_2$, and $Al(NO_3)_3$.

Examples of suitable titanium compounds are $Ti(SO_4)_2$ and $Ti(NO_3)_4$. An example of a suitable zirconium compound is zirconium nitrate, empirical formula $Zr(NO_3)_4$.

Examples of suitable compounds of molybdenum are $MoO_3$, $Na_2MoO_4$, and $Li_2MoO_4$.

Examples of suitable compounds of tungsten are $WO_3$, $Na_2WO_4$, $H_2WO_4$, and $Li_2WO_4$.

Examples of suitable compounds of magnesium are $MgSO_4$, $Mg_2Cl_2$ and $Mg(NO_3)_2$.

An example of a suitable boron compound is boric acid, empirical formula $H_3BO_3$.

In one embodiment, the amount of compound of $M^1$ is in the range of from 0.01 to 5.0 mol-%, referring to TM, preferred are 0.1 to 2.0 mol-%.

In one embodiment of the present invention, said treatment is carried out with a solution of a compound of $M^1$ in a mineral acid, for example a solution of $Al_2(SO_4)_3$ in aqueous $H_2SO_4$.

The treatment in step (c) may be performed by adding the mineral acid or the solution of $M^1$ to the cathode active material of step (c) and allowing the resultant mixture to interact. Such interaction may be enhanced by stirring.

In one embodiment of the present invention, step (c) is performed at a temperature in the range of from 5 to 85° C., preferred are 10 to 60° C. Ambient temperature is particularly preferred.

In one embodiment of the present invention, step (c) is performed at normal pressure. It is preferred, though, to perform step (c) at elevated pressure, for example at 10 mbar to 10 bar above normal pressure, or with suction, for example 50 to 250 mbar below normal pressure, preferably 100 to 200 mbar below normal pressure.

In one embodiment of the present invention, step (c) is performed in a filter device with stirrer, for example a pressure filter with stirrer or a suction filter with stirrer.

The duration of treatment of the material obtained from step (c) with compound of $M^1$ may be in the range of from 2 to 60 minutes, preferred are 10 to 45 minutes.

In one embodiment of the present invention, the volume ratio of material obtained from step (c) to mineral acid or solution of compound of $M^1$, respectively, is in the range of from 1:1 to 1:10, preferably 1:1 to 1:5.

In one embodiment of the present invention, steps (c) including the removal of water are performed in the same vessel, for example in a filter device with stirrer, for example a pressure filter with stirrer or a suction filter with stirrer.

In one embodiment of the present invention, step (c) is repeated, for example once to 10 times. In preferred embodiments, step (c) is performed only once.

As a part of step (c), water is removed. Said water removal may be by evaporation or preferably by solid-liquid separation methods, for example by decantation of by any type of filtration, for example on a band filter or in a filter press. Step (e) may include complete or partial removal of water, a partial removal being preferred. Together with water, mineral acid and/or non-deposited compound of $M^1$ and or lithium salt may be removed. A residue is obtained that may contain 0.01 to 5% by weight residual moisture.

In one embodiment of the present invention, filter media may be selected from ceramics, sintered glass, sintered metals, organic polymer films, non-wovens, and fabrics.

In step (d), said residue is treated thermally.

Step (d) may be carried out in any type of oven, for example a roller hearth kiln, a pusher kiln, a rotary kiln, a pendulum kiln, or—for lab scale trials—in a muffle oven.

The temperature of the thermal treatment according to step (d) may be in the range of from 150 to 290 or from 300 to 500° C.

The temperature of 300 to 500° C. corresponds to the maximum temperature of step (d).

It is possible to subject the material obtained from step (c) directly to step (d). However, it is preferred to increase the temperature stepwise, or to ramp up the temperature, or to dry the material obtained after step (c) at first at a temperature in the range of from 40 to 80° C. before subjecting it to step (d).

Said step-wise increase or ramping up may be performed under normal pressure or reduced pressure, for example 1 to 500 mbar.

Step (d)—at its maximum temperature—may be performed under normal pressure.

In one embodiment of the present invention, step (d) is carried out under an oxygen-containing atmosphere, for example air, oxygen-enriched air or pure oxygen.

In embodiments wherein a drying at a temperature in the range of from 100 to 250° C. prior to step (d) is performed such drying may be performed with a duration of from 10 minutes to 12 hours.

In one embodiment of the present invention, step (d) is carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform step (d) under an atmosphere with a carbon dioxide content below detection limit for example with infrared-light based optical methods.

In one embodiment of the present invention step (d) has a duration in the range of from 1 to 10 hours, preferably 90 minutes to 6 hours.

In one embodiment of the present invention, the lithium content of an electrode active material is reduced by 1 to 5% by weight, preferably 2 to 4%. Said reduction mainly affects the so-called residual lithium.

By carrying out the inventive process, electrode active materials are obtained with excellent electrochemical properties. Without wishing to be bound by any theory, we assume that the extra aluminum may lead to scavenging lithium compounds deposited at the surface of the electrode active material.

In another embodiment of the present invention, step (e) is performed after step (c). Step (e) includes treating the resultant solid residue with 0.1 to 2 wt % flux agent relative to the cathode active material $Li_{1+x}TM_{1-x}O_2$, followed by thermal treatment. Cathode active material $Li_{1+x}TM_{1-x}O_2$ is mixed with flux agent for 2 to 30 min, preferably by using a plough-share mixer, or a tumble mixer. For laboratory scale experiments, roller mills or ball mills may be applied as well.

The subsequent heat treatment is carried out as described in step (d).

In one embodiment of the present invention, the materials obtained from step (d) or (e), respective, are milled, for example in an air-classifying mill. In laboratory-scale experiments, ball mills and stirred ball mills are suitable as well.

Inventive materials are excellently suited as cathode active materials, especially since they display both a high energy density and a high energy density retention rate.

A further aspect of the present invention are electrodes comprising at least one inventive cathode active material. They are particularly useful for lithium ion batteries. Lithium ion batteries comprising at least one electrode according to the present invention exhibit a very good discharge and cycling behavior, and they show good safety behavior.

In one embodiment of the present invention, inventive cathodes contain
(A) at least one inventive material, as described above,
(B) carbon in an electrically conductive state, and
(C) a binder,
(D) a current collector.

In a preferred embodiment of the present invention, inventive cathodes contain
(A) 80 to 99% by weight inventive material,
(B) 0.5 to 19.5% by weight of carbon,
(C) 0.5 to 9.5% by weight of binder material,
percentages referring to the sum of (A), (B) and (C).

Cathodes according to the present invention contain carbon in electrically conductive modification, in brief also referred to as carbon (B). Carbon (B) can be selected from soot, active carbon, carbon nanotubes, graphene, and graphite. Carbon (B) can be added as such during preparation of electrode materials according to the invention.

Electrodes according to the present invention can comprise further components. They can comprise a current collector (D), such as, but not limited to, an aluminum foil. They further comprise a binder material (C), hereinafter also referred to as binder (C). Current collector (D) is not further described here.

Suitable binders (C) are preferably selected from organic (co)polymers. Suitable (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth)acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (C) is polybutadiene.

Other suitable binders (C) are selected from polyethylene oxide (PEO), cellulose, carboxymethylcellulose, polyimides and polyvinyl alcohol.

In one embodiment of the present invention, binder (C) is selected from those (co)polymers which have an average molecular weight MW in the range from 50,000 to 1,000,000 g/mol, preferably to 500,000 g/mol.

Binder (C) may be cross-linked or non-cross-linked (co)polymers.

In a particularly preferred embodiment of the present invention, binder (C) is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (C) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive electrodes may comprise 0.5 to 9.5 by weight of binder(s) (C), referring to the sum of component (A), carbon (B) and binder (C).

A further aspect of the present invention is a battery, containing
(A) at least one cathode comprising inventive material (A), carbon (B), and binder (C),
(B) at least one anode, and
(C) at least one electrolyte.

Embodiments of cathode (1) have been described above in detail.

Anode (2) may contain at least one anode active material, such as carbon (graphite), $TiO_2$, lithium titanium oxide, silicon or tin. Anode (2) may additionally contain a current collector, for example a metal foil such as a copper foil.

Electrolyte (3) may comprise at least one non-aqueous solvent, at least one electrolyte salt and, optionally, additives.

Non-aqueous solvents for electrolyte (3) can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight MW of suitable polyalkylene glycols and in particular suitable polyethylene glycols can be at least 400 g/mol.

The molecular weight MW of suitable polyalkylene glycols and in particular suitable polyethylene glycols can be up to 5,000,000 g/mol, preferably up to 2,000,000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds of the general formulae (II) and (III)

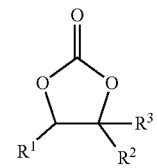

(II)

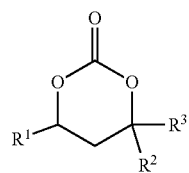

(III)

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

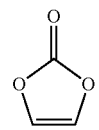

(IV)

The solvent or solvents is/are preferably used in the water-free state, i.e. with a water content in the range from 1 ppm to 0.1% by weight, which can be determined, for example, by Karl-Fischer titration.

Electrolyte (3) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur,
t=2, when Y is selected from among nitrogen and phosphorus, and
t=3, when Y is selected from among carbon and silicon.

Preferred electrolyte salts are selected from among LiC($CF_3SO_2$)$_3$, LiN($CF_3SO_2$)$_2$, $LiPF_6$, $LiBF_4$, $LiClO_4$, with particular preference being given to $LiPF_6$ and LiN($CF_3SO_2$)$_2$.

In a preferred embodiment of the present invention, electrolyte (3) contains at least one flame retardant. Useful flame retardants may be selected from trialkyl phosphates, said alkyl being different or identical, triaryl phosphates, alkyl dialkyl phosphonates, and halogenated trialkyl phosphates. Preferred are tri-$C_1$-$C_4$-alkyl phosphates, said $C_1$-$C_4$-alkyls being different or identical, tribenzyl phosphate, triphenyl phosphate, $C_1$-$C_4$-alkyl di-$C_1$-$C_4$-alkyl phosphonates, and fluorinated tri-$C_1$-$C_4$-alkyl phosphates, In a preferred embodiment, electrolyte (3) comprises at least one flame retardant selected from trimethyl phosphate, $CH_3$—P(O)(OCH$_3$)$_2$, triphenylphosphate, and tris-(2,2,2-trifluoroethyl)phosphate.

Electrolyte (3) may contain 1 to 10% by weight of flame retardant, based on the total amount of electrolyte.

In an embodiment of the present invention, batteries according to the invention comprise one or more separators (4) by means of which the electrodes are mechanically separated. Suitable separators (4) are polymer films, in particular porous polymer films, which are unreactive toward metallic lithium. Particularly suitable materials for separators (4) are polyolefins, in particular film-forming porous polyethylene and film-forming porous polypropylene.

Separators (4) composed of polyolefin, in particular polyethylene or polypropylene, can have a porosity in the range from 35 to 50%. Suitable pore diameters are, for example, in the range from 30 to 500 nm.

In another embodiment of the present invention, separators (4) can be selected from among PET nonwovens filled with inorganic particles. Such separators can have a porosity in the range from 40 to 55%. Suitable pore diameters are, for example, in the range from 80 to 750 nm.

Batteries according to the invention can further comprise a housing which can have any shape, for example cuboidal or the shape of a cylindrical disk. In one variant, a metal foil configured as a pouch is used as housing.

Batteries according to the invention provide a very good discharge and cycling behavior, in particular at high temperatures (45° C. or higher, for example up to 60° C.) in particular with respect to the capacity loss.

Batteries according to the invention can comprise two or more electrochemical cells that combined with one another, for example can be connected in series or connected in parallel. Connection in series is preferred. In batteries according to the present invention, at least one of the electrochemical cells contains at least one electrode according to the invention. Preferably, in electrochemical cells according to the present invention, the majority of the electrochemical cells contain an electrode according to the present invention. Even more preferably, in batteries according to the present invention all the electrochemical cells contain electrodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The invention is further illustrated by a working example.

WORKING EXAMPLE

General:

Powder X-ray Diffraction (PXRD) data was collected using a laboratory diffractometer (D8 Discover, Bruker AXS GmbH, Karlsruhe). The instrument was set up with a Molybdenum X-ray tube. The characteristic K-alpha radiation was monochromatized using a bent Germanium Johansson type primary monochromator. Data was collected in the Bragg-Brentano reflection geometry in a 2θ range from 5.0 to 50°, applying a step size of 0.019°. A LYNXEYE area detector was utilized to collect the scattered X-ray signal. Strains were obtained by Rietveld refinement using the modelling software DIFFRAC.TOPAS provided by BrukerAXS GmbH, Karlsruhe Electrode manufacture: Electrodes contained 92.5% CAM, 2% carbon black (Super C65), 2% graphite (SFG6L) and 3.5% binder (polyvinylidene fluoride, Solef 5130). Slurries were mixed in N-methyl-2-pyrrolidone and cast onto aluminum foil by doctor blade. After drying of the electrodes 6 h at 105° C. in vacuo, circular electrodes were punched, weighed and dried at 120° C. under vacuum for 12 hours before entering in an Ar filled glove box.

Half-Cell Electrochemical Measurements: Coin-type electrochemical cells, were assembled in an argon-filled glovebox. The positive 14 mm diameter (loading 8.0±0.5 mg cm$^{-2}$) electrode was separated from the 0.58 thick Li foil by a glass fiber separator (Whatman GF/D). An amount of 95 μl of 1 M $LiPF_6$ in fluoroethylene carbonate (FEC):diethyl carbonate (DEC), 2:8 by weight, was used as the electrolyte. Cells were galvanostatically cycled at a Maccor 4000 battery cycler between 2.0 and 4.8 V at room temperature by applying a C-rates of 0.067 C.

Manufacture of p-CAM.1:

A mixed manganese sulfate—nickel sulfate solution with the concentrations $c_1$(Mn)=1.10 mol/kg and $c_1$(Ni)=0.55 mol/kg, further referred to as solution 1, was combined with an aqueous 25 wt. % NaOH solution, further referred to as solution 2, at 50° C. under nitrogen atmosphere using a continuously stirred tank reactor with a volume V=2.4 l. The individual flow rates of the solutions, further referred to as $f_i$ with i referring to the number of the corresponding solution, were adjusted to meet a residence time $t_{res}$=V/($f_1$+$f_2$)=5 h, a pH value of 11 to 12.5. A stirrer with two crossed blades was applied using a stirring speed of 850 rpm. Particles with an average particle diameter size d50=3.5 μm were precipitated in the reactor and transferred into a second vessel by a continuous flow through an outlet for collection. Afterwards, the freshly precipitated particles were washed with deionized water at room temperature under air, dried at 80° C. for 12 hours and sieved. p-CAM.1 was obtained.

Manufacture of CAM.1:

The oxy(hydroxide) precursor p-CAM.1 was subsequently mixed with $Li_2CO_3$ monohydrate in a molar ratio of Li:(Mn+Ni) of 1.31:1. An amount of 0.6 mol-% boric acid relative to the oxy(hydroxide) precursor was added, poured into an alumina crucible and calcined at 960° C. for 5 hours under oxygen atmosphere (10 exchanges/h) using a heating rate of 2° C./min. The resultant material was cooled to ambient temperature at a cooling rate of 10° C./min and subsequently sieved with a mesh size of 32 μm. After sieving, the material was stirred in a beaker with 80 mL of aqueous $H_2SO_4$ (0.1M) for 20 min. Afterwards the liquid phase was removed by filtration and the filter cake was rinsed with 80 mL $H_2O$. Then the powder was again stirred in a beaker with 80 mL of aqueous $H_2SO_4$ (0.1 M) for another 20 min. The liquid phase was removed by filtration and the filter cake was washed with 2×80 mL $H_2O$. The resultant filter cake was dried in vacuum for 3 hours at 65° C., then dried for 16 hours at 300° C. and cooled down to ambient temperature. After de-agglomeration by ball-milling with zirconium balls in a zirconium jar, CAM.1 was obtained with an average primary particle diameter of 200 nm and a press density of 3.1 g cm$^{-3}$. The average particle diameter size D50 was 3.5 μm, the structural strain for the reflection peak between 29.8 to 30.6° of the corresponding X-Ray diffraction pattern using Mo-Kα X-radiation was 0.05. CAM.1 showed a discharge capacity of 233 mAh/g in the first cycle and 176 mAh/g in the 50$^{th}$ cycle.

Manufacture of C-CAM.2:

The oxy(hydroxide) precursor C-p-CAM.1 was mixed with $Li_2CO_3$ monohydrate in a molar ratio of Li:(Mn+Ni) of 1.31:1 poured into an alumina crucible and calcined at 900° C. for 5 hours under oxygen atmosphere (10 exchanges/h) using a heating rate of 2° C./min. The resultant material was cooled to ambient temperature at a cooling rate of 10° C./min and subsequently sieved with a mesh size of 32 μm. After sieving, the material was stirred in a beaker with 80 mL of aqueous $H_2SO_4$ (0.1M) for 20 min. Afterwards the liquid phase was removed by filtration and the filter cake was rinsed with 80 mL $H_2O$. Then the powder was again stirred in a beaker with 80 mL of aqueous $H_2SO_4$ (0.1 M) for another 20 min. The liquid phase was removed by filtration and the filter cake was washed with 2×80 mL $H_2O$. The resultant filter cake was dried in vacuum for 3 hours at 65° C., then dried for 16 hours at 300° C. and cooled down to ambient temperature to obtain c-CAM.1 with a press density at 250 MPa of 2.7 g cm$^{-3}$. The average particle diameter size was D50=8.7 μm and the structural strain for the reflection peak between 29.8 to 30.6° of the corresponding X-Ray diffraction pattern using Mo-Kα X-radiation was 0.19. C-CAM.2 showed a discharge capacity of 113 mAh/g in the first cycle and 48 mAh/g in the 50$^{th}$ cycle.

The invention claimed is:

1. A cathode active material in particulate form with a mean particle diameter ranging from 2 μm to 16 μm (D50), wherein the cathode active material has a composition $Li_{1+x}TM_{1-x}O_2$, wherein x ranges from 0.1 to 0.2 and TM is a combination of elements according to general formula (I), $$(Ni_aCo_bMn_c)_{1-d-e}M^1_dM^2_e \qquad (I)$$

wherein:
a ranges from 0.20 to 0.40,
b ranges from zero to 0.15,
c ranges from 0.50 to 0.75,
d ranges from zero to 0.015, and
e ranges of from zero to 0.02,
$M^1$ is selected from Al, Ti, Zr, Mo, Fe, Nb, and Mg,
$M^2$ is selected from B and K,
with a+b+c=1.0
wherein the cathode active material has a specific surface (BET) ranging from 0.5 m$^2$/g to 10 m$^2$/g and a pressed density of at least 2.9 g/cm$^3$, and
wherein the cathode active material has an average primary particle diameter in the range of from 200 nm to 3,000 nm.

2. The cathode active material according to claim 1, wherein the specific surface ranges from 0.7 m$^2$/g to 5 m$^2$/g.

3. The cathode active material according to claim 1, wherein the pressed density ranges from 3 to 3.6 g/cm$^3$.

4. The cathode active material according to claim 1, wherein the material has a structural strain of 0.6% or less for the reflection peak between 29.8° to 30.6° of a corresponding X-Ray diffraction pattern using Mo-Kα X-radiation.

5. The cathode active material according to claim 1, wherein the mean particle diameter D50 ranges from 2 μm to 6 μm.

* * * * *